(12) United States Patent
Serhan et al.

(10) Patent No.: US 8,840,124 B2
(45) Date of Patent: Sep. 23, 2014

(54) ROLLATOR HAVING A SIT-TO-LOCK BRAKE

(75) Inventors: Michael Serhan, Arcadia, CA (US);
Doug Francis, Irvine, CA (US)

(73) Assignee: Medical Depot, Inc., Port Washington, NY (US)

( * ) Notice: Subject to any disclaimer, the term of this patent is extended or adjusted under 35 U.S.C. 154(b) by 154 days.

(21) Appl. No.: 13/350,530

(22) Filed: Jan. 13, 2012

(65) Prior Publication Data
US 2013/0181489 A1  Jul. 18, 2013

(51) Int. Cl.
*A61H 3/04* (2006.01)

(52) U.S. Cl.
CPC ........................................ *A61H 3/04* (2013.01)
USPC .................................................. 280/87.021

(58) Field of Classification Search
CPC ............... A61H 2003/046; A61H 2201/0173; A61H 2201/1633; A61H 3/04; B60T 7/08; B60T 7/12; B60T 7/14
USPC ..................... 297/129, 5; 482/68; 135/67, 85; 280/87.021, 87.05, 87.051; 188/68
See application file for complete search history.

(56) References Cited

U.S. PATENT DOCUMENTS

| | | | | | |
|---|---|---|---|---|---|
| 5,203,433 | A | * | 4/1993 | Dugas | 188/2 F |
| 5,366,231 | A | * | 11/1994 | Hung | 280/87.051 |
| 5,716,063 | A | * | 2/1998 | Doyle et al. | 280/87.05 |
| 5,896,779 | A | * | 4/1999 | Biersteker et al. | 74/502.2 |
| 6,338,355 | B1 | * | 1/2002 | Cheng | 135/67 |
| 6,378,663 | B1 | * | 4/2002 | Lee | 188/2 F |
| 7,179,200 | B1 | * | 2/2007 | Wu | 482/51 |
| 7,992,584 | B1 | * | 8/2011 | Birnbaum | 135/67 |
| 2002/0089140 | A1 | * | 7/2002 | Lu | 280/87.051 |
| 2003/0094191 | A1 | * | 5/2003 | Lin | 135/65 |
| 2010/0066056 | A1 | * | 3/2010 | Li et al. | 280/304.1 |
| 2012/0090926 | A1 | * | 4/2012 | Dunlap | 188/68 |
| 2014/0084559 | A1 | * | 3/2014 | Fang | 280/47.38 |

* cited by examiner

*Primary Examiner* — J. Allen Shriver, II
*Assistant Examiner* — Brian Cassidy
(74) *Attorney, Agent, or Firm* — McCarter & English, LLP

(57) ABSTRACT

A safety brake type rollator that will prevent the misuse of rollators by seated users by using a braking system that locks the rollator wheels when the user sits down on the rollator seat, and releases when the user stands up. The cables that run from the hand brakes of the rollator to under the rollator seat are stretched by the user sitting down on the rollator seat, so locking the wheels. According to a further embodiment, whenever a user sits on the seat the braking system pulls the hand brakes into the locked position, so engaging the wheel brake mechanisms. According to this further embodiment, the hand brakes must then be disengaged from the locked position when the user stands up from the seat for the rollator to be mobile.

20 Claims, 7 Drawing Sheets

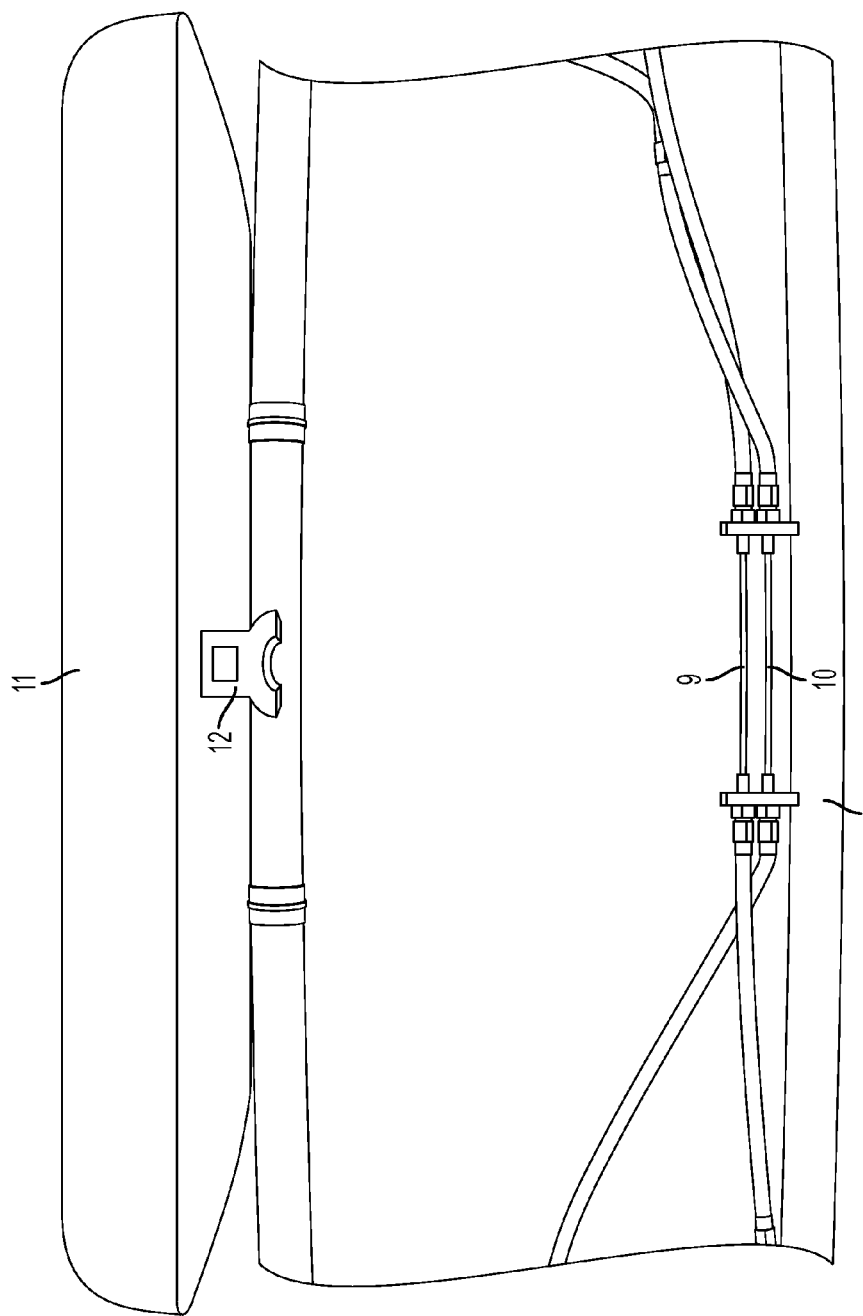

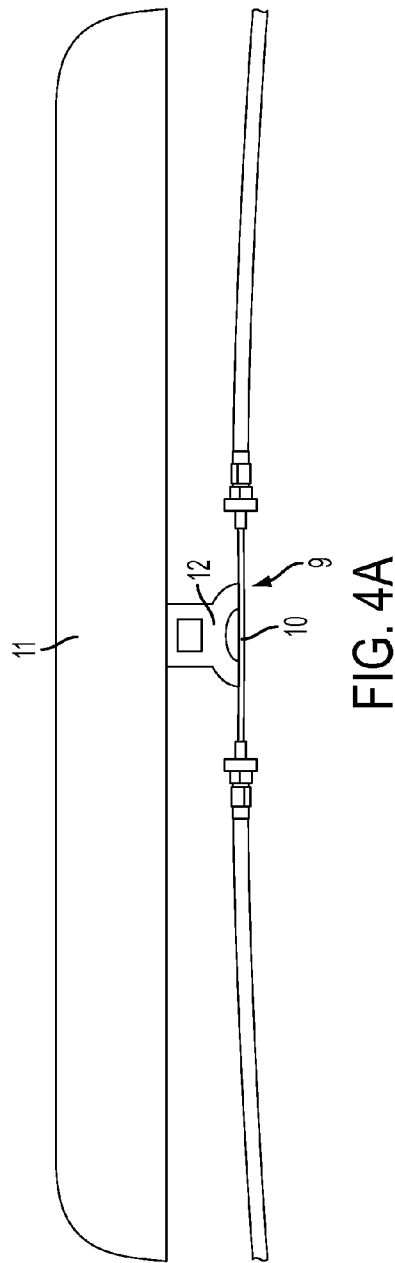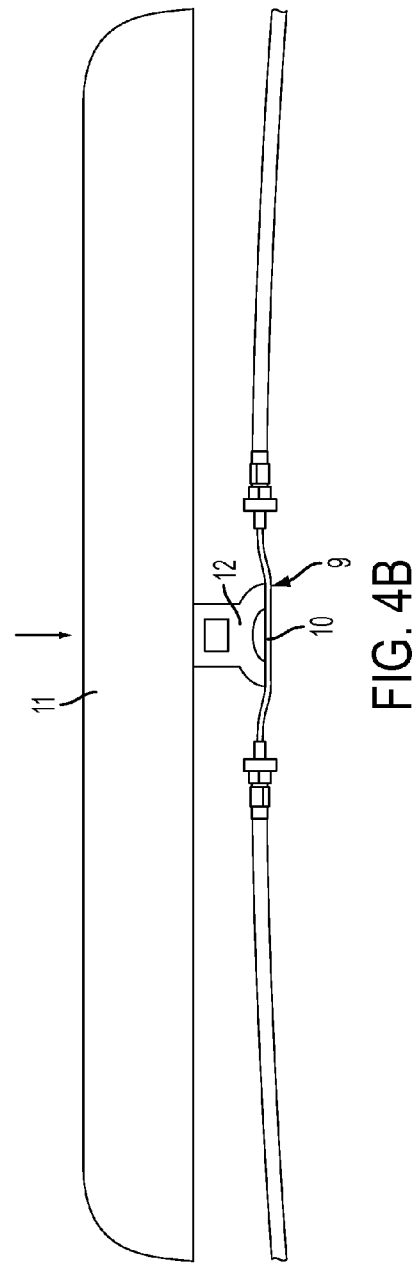

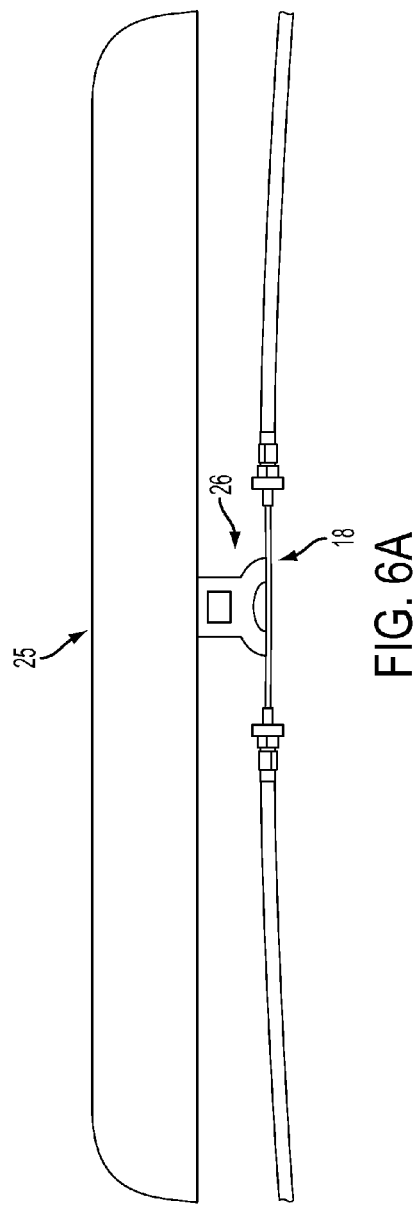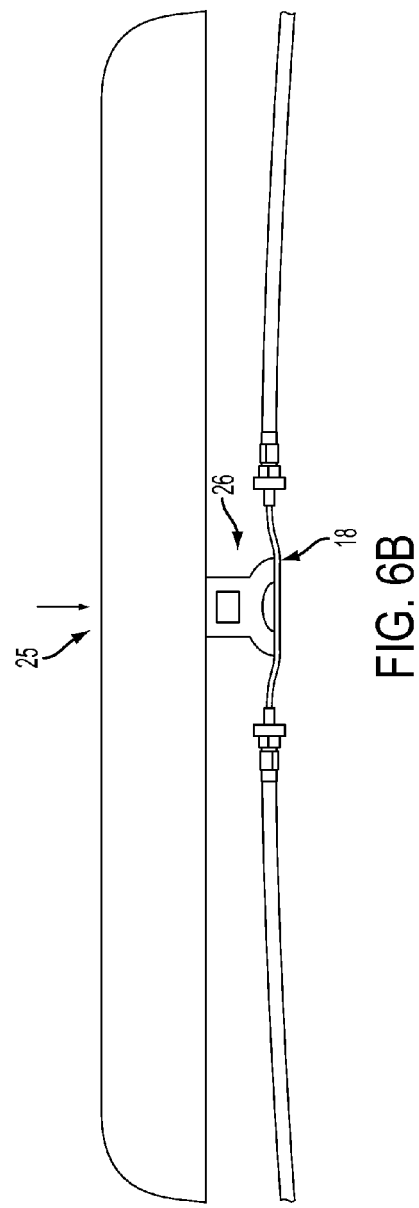

ROLLATOR HAVING A SIT-TO-LOCK BRAKE

FIELD OF INVENTION

The present invention relates to a wheeled walking frame, also known in the art as a rollator, having a brake mechanism that ensures the wheels are locked when the user sits down on the rollator's seat. This ensures that the rollator may not be wheeled while the user is sitting down on it.

BACKGROUND

Wheeled walking frames, known in the art as rollators, are used by individuals who require assistance in maintaining their mobility, but do not generally require a wheel chair. Rollators are commonly used by senior citizens or the disabled to support their need for mobility in normal activities both inside and outside the home. Many rollators provide a seat for users to rest on if they become tired of walking while using the rollator. These rollator seats are provided solely for the purpose of rest, and are not provided so that the user can sit on them while the rollator is moved. However, in practice, users frequently ignore express instructions not to sit and move the rollator at the same time. Users while seated typically either wheel the rollator with their feet or have another individual push the rollator for them. Since rollators are expressly not designed for this kind of use, this results in substantial risk to the seated user if the rollator wheels encounter a crack in a pavement or other obstacle which causes the rollator to unbalance and tip over. This misuse of the rollator seat has resulted in serious injuries to seated users from falling out of the unbalanced rollator; often such injuries occur to the back of the head. There is a need to prevent users from placing themselves at significant risk by sitting and being wheeled in a rollator at the same time. The present invention provides such a means through a sit-to-lock brake.

SUMMARY OF INVENTION

It is the object of the invention to provide a safety brake type rollator that will prevent the misuse of rollators by seated users comprising a braking system that locks the rollator wheels when the user sits down on the rollator seat and releases when the user rises out of the seat.

It is a further object of the invention to provide a safety brake type rollator that will prevent the misuse of rollators by seated users comprising a braking system that operates through cables that run from the hand brakes to under the rollator seat and then to the wheel brake mechanisms. The cables running under the seat are stretched by the user sitting down, thus locking the wheels.

It is also an object of the invention to provide a safety brake type rollator that will prevent the misuse of rollators by seated users comprising a braking system that comprises two sets of cables. One set of cables runs from the hand brakes to the wheel brake mechanisms, while another cable runs underneath the seat between the hand brakes. The cable running under the seat is stretched by the user sitting down, thus locking the hand brakes in the locked position.

The above object of the present invention may be achieved by a safety brake type rollator that comprises two handle bars each with a hand brake, two cross bars, two wheel brake mechanisms, cables connecting the hand brakes to the wheel brake mechanism, and a seat. The cables are positioned under the seat so that whenever a user sits on the seat, the weight of the user presses a push block mounted under the seat downwards and causes pressure to bear on the cables from the seat, such that the cables are stretched and the wheel brake mechanisms are engaged. The hand brakes may still be used as normal when the user is not sitting in the seat.

The above object of the present invention may also be achieved by a safety brake type rollator that comprises two handle bars each with a hand brake, two cross bars, two wheel brake mechanisms, a set of cables connecting the hand brakes to the wheel brake mechanisms, a seat, and a cable between the hand brakes that runs underneath the seat. The cable between the hand brakes is positioned under the seat so that whenever a user sits on the seat, the weight of the user presses a push block mounted under the seat downwards and causes pressure to bear on the cable from the seat, such that the cable is stretched and pulls the hand brakes into the locked position, thus engaging the wheel brake mechanisms. According to this embodiment, the brakes remain locked when the user rises out of his/her seat. The hand brakes must then be disengaged from the locked position when the user stands up from the seat. The hand brakes may still be used as normal when the user is not sitting in the seat.

BRIEF DESCRIPTION OF THE DRAWINGS

The accompanying drawings, which are included to provide a fuller understanding of the invention, illustrate exemplary embodiments of the invention together with the description herein.

FIG. 3 is an overhead view of a safety brake type rollator of the invention from above the raised seat showing the cables running past each other along the cross bar underneath the seat with the seat raised. The push block mounted underneath the raised seat is shown in side view.

FIG. 4A is a side close-up view of the cables crossing underneath the seat and the push block mounted underneath the seat and resting on the cables. FIG. 4B is a side close-up view of the cables crossing underneath the seat and the push block mounted underneath the seat with the user seated and the cables now stretched, thus activating the brake mechanism.

FIG. 6A is a side close-up view of the cable crossing underneath the seat and the push block mounted underneath the seat. FIG. 6B is a side close-up view of the cables crossing underneath the seat and the push block mounted underneath the seat with the user seated and the cables now stretched, thus activating the brake mechanism.

DETAILED DESCRIPTION OF THE PREFERRED EMBODIMENT

Figure 1:
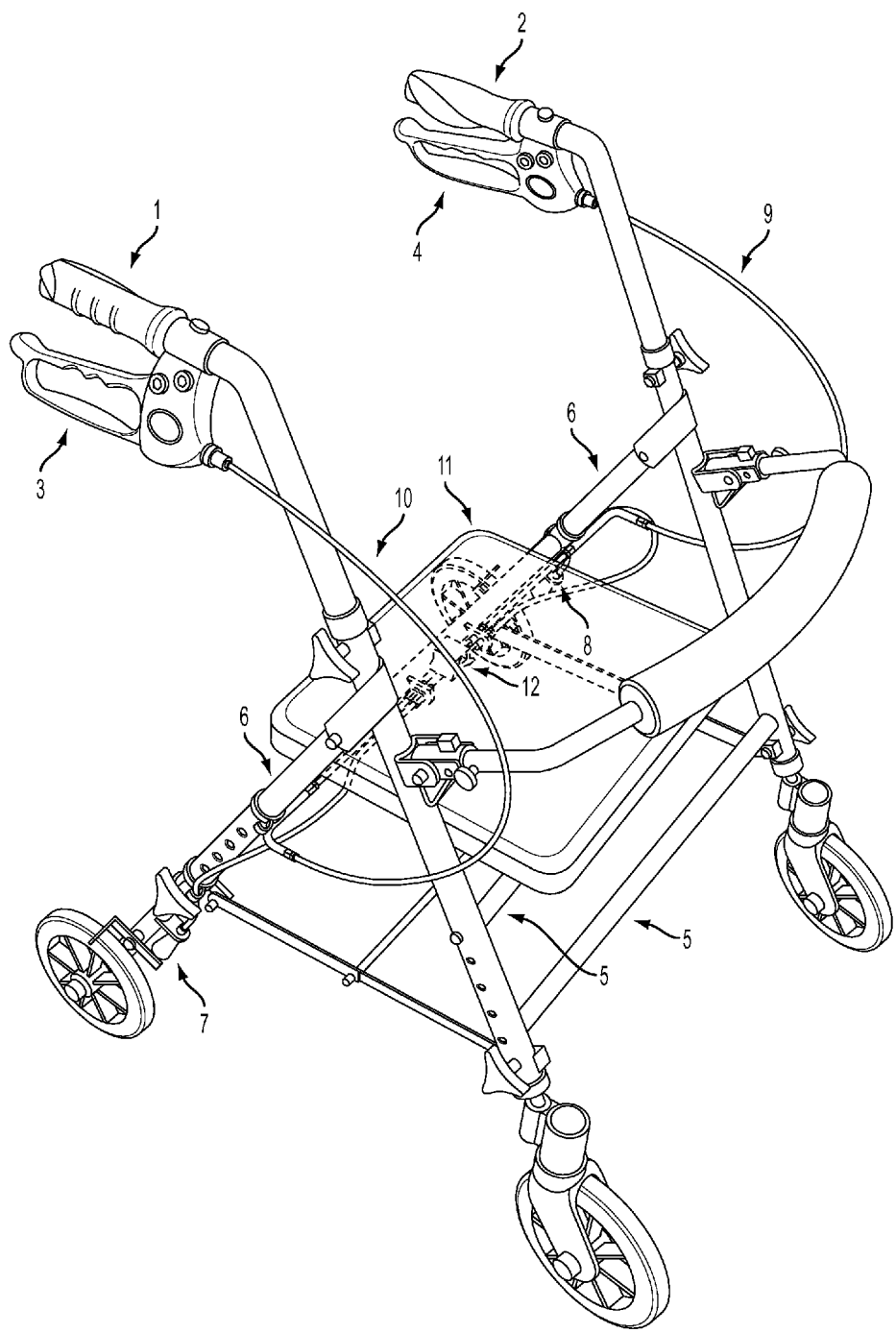
FIG. 1 is an entire contour view of a safety brake type rollator of the invention with cables running from the hand brakes then under the seat to the wheel braking mechanism.

Referring to FIG. 1A, a safety brake type rollator in one embodiment of the present invention comprises two handle bars 1, 2; two hand brakes, 3, 4; two cross bars, 5, 6; two wheel brake mechanisms, 7, 8; two cables, 9, 10, which are fixed onto the hand brakes and run past each other parallel to cross bar 5 before running down to the wheel brake mechanisms; and a seat, 11, with a push block, 12, mounted on the seat and resting on the cables.

One of ordinary skill in the art understands that "hand brakes" or "wheel brake mechanisms" may be designed to operate in a variety of different ways so as to be operated by the sit-to-lock design described herein. The brake mechanisms described herein, which operate via blades that stop the wheels turning, are illustrative, not limiting. The present invention is not limited to any particular form of hand brakes or wheel brake mechanism.

One of ordinary skill in the art understands that "rollator" refers typically to four wheeled walking frames or mobility aids. The rollators or four wheeled walking frames or mobility aids described herein, which are standard commercial rollators, are illustrative, not limiting. The present invention is not limited to any particular form of rollator or four wheeled walking frame or mobility aid.

One of ordinary skill in the art understands that the present invention is not limited by the kinds of materials used to make the rollator or whether the rollator is designed to fold into smaller spaces or otherwise designed for operational convenience.

Figure 2:
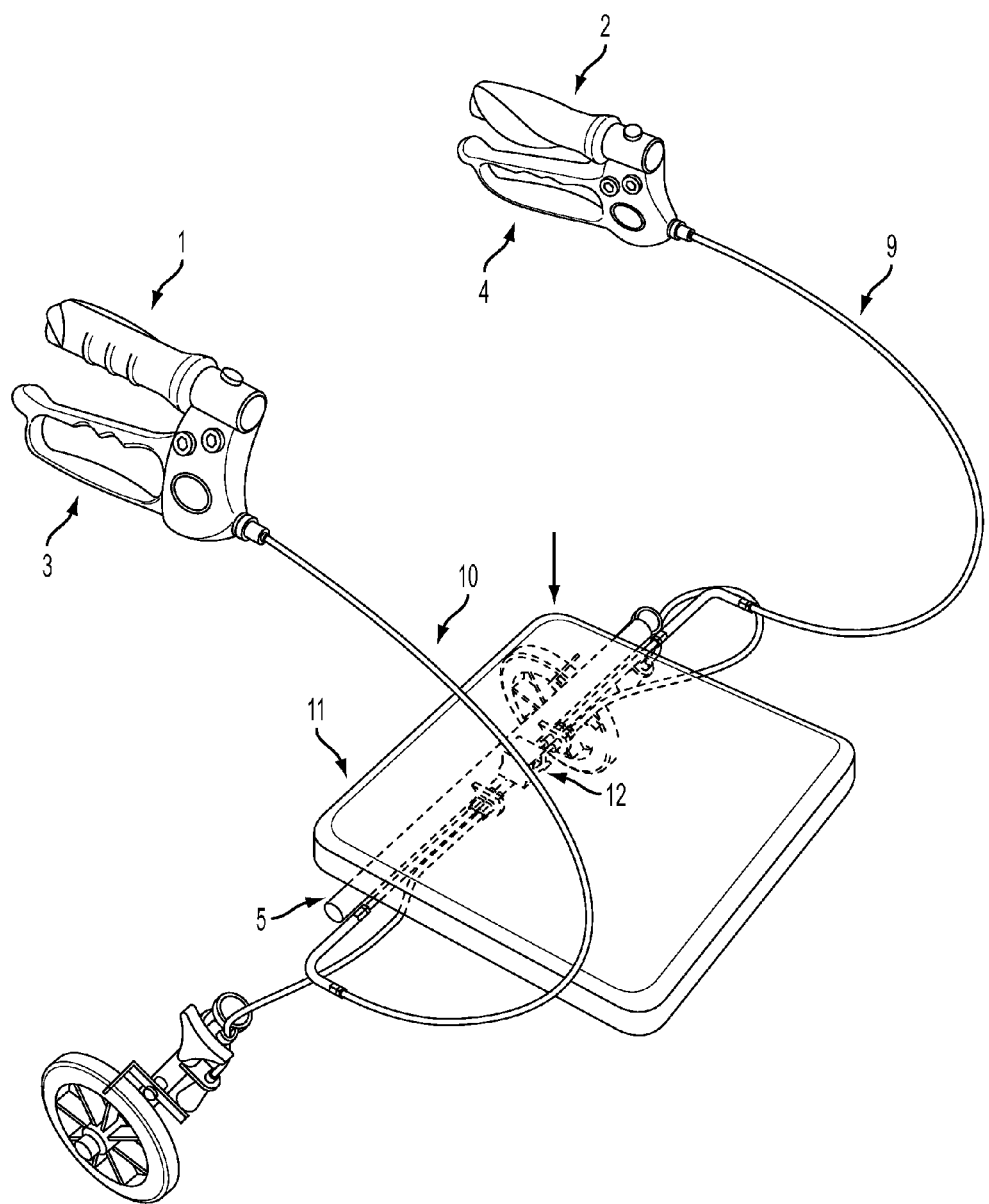
FIG. 2 is a simplified view of a safety brake type rollator of the invention showing the cables running from the hand brakes then crossing past each other under the seat before running down to the wheel braking mechanism. The seat and push block are shown.

Referring to FIG. 2, the walking frame has been removed to show the manner in which the cables run from the hand brakes then underneath the seat and then down to the wheel brake mechanisms. When the seat, 11, is pressed down by the weight of the user sitting down on it, the push block, 12, is pressed down onto the cables, 9, 10. The direction of downward force transmitted through the push block to the cables is shown by the thick arrow in FIG. 2. The pressure on the cables causes them to stretch, and so activate the wheel brake mechanisms.

Referring to FIG. 3, the push block, 12, is seen mounted on the under side of the seat, 11, in an overhead view with the seat in a raised position. The cables, 9, 10, run parallel to each other alongside the cross bar, 6. When the seat is lowered, the push block contacts both cables and rest on them.

When the user is seated in the rollator seat the cables, 9, 10, are now pushed down by the under surface of the push block so as to stretch them. The stretching of the cables by the push block mounted under the seat due to the weight of the seated rollator user then activates the wheel brake mechanisms and locks the rollator in place. As a result, the rollator may not be pushed or wheeled while the user remains seated.

Referring to FIG. 4A, the push block, 12, rests upon the cables, 9, 10, but does not stretch them in the absence of the weight of the rollator user sitting on the seat, 11. Referring to FIG. 4B, the direction of force of the weight of the rollator user is shown with a thick arrow. The cables, 9, 10, are now stretched so as to activate the wheel brake mechanisms.

Figure 5:
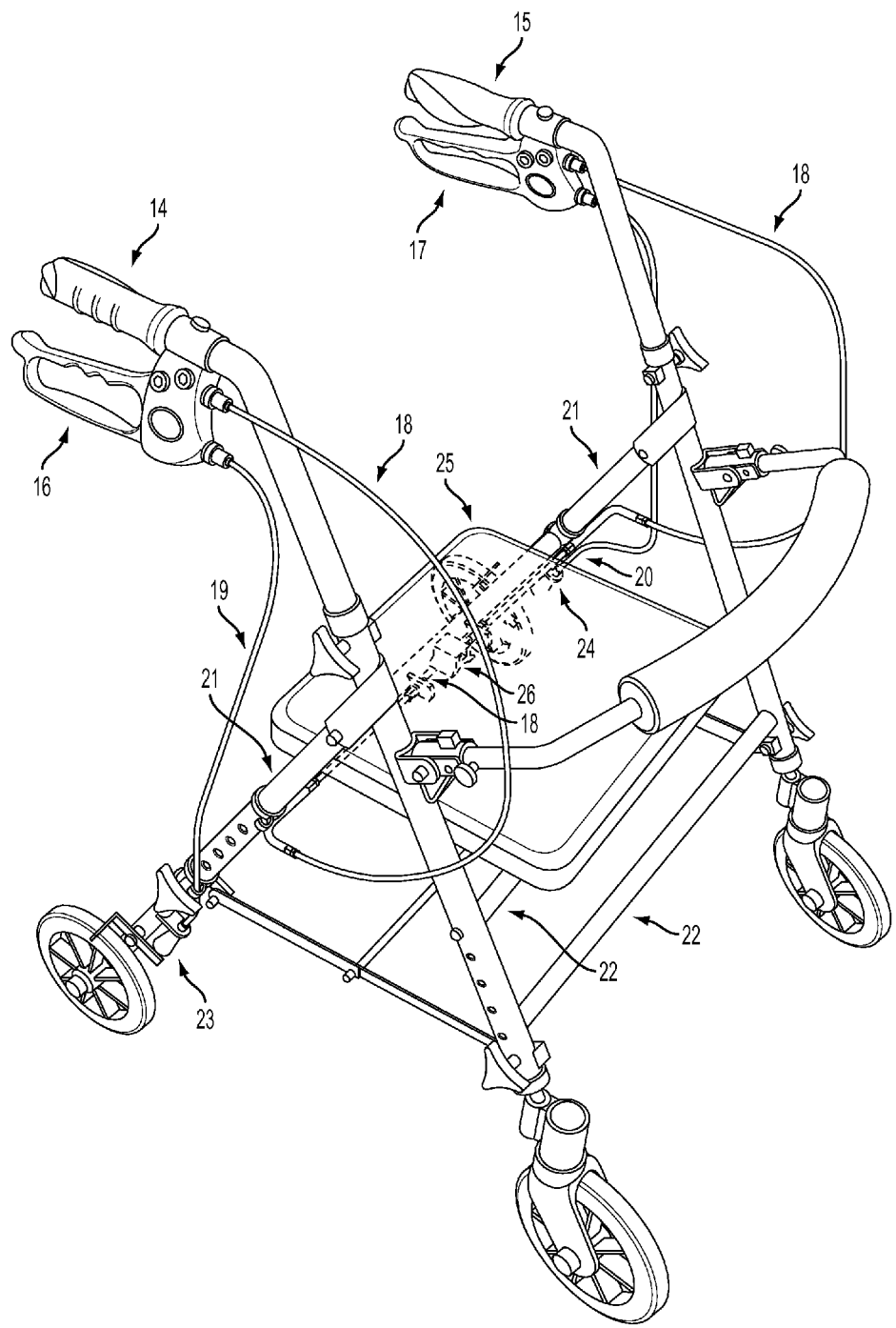
FIG. 5 is an entire contour view of a safety brake type rollator of the invention with one set of cables running from the hand brakes to the wheel braking mechanism and another cable running underneath the seat between the hand brakes.

Referring to FIG. 5, a safety brake type rollator in one embodiment of the present invention mainly comprises two handle bars, 14, 15; two hand brakes, 16, 17; two cross bars, 21, 22; two wheel brake mechanisms, 23, 24; two cables, 19, 20, that run from the hand brakes to the wheel brake mechanisms; another cable, 18, that runs between the hand brakes underneath the seat, 25; and a push block, 26, mounted underneath the seat that rests on cable 18.

Referring to FIG. 6A, the push block, 26, rests upon the cable, 18, but does not stretch it in the absence of the weight of the rollator user sitting on the seat, 25. Referring to FIG. 6B, the direction of force of the weight of the rollator user is shown with a thick arrow. The cable, 18, is now stretched so as to activate the wheel brake mechanisms.

Figure 7A:
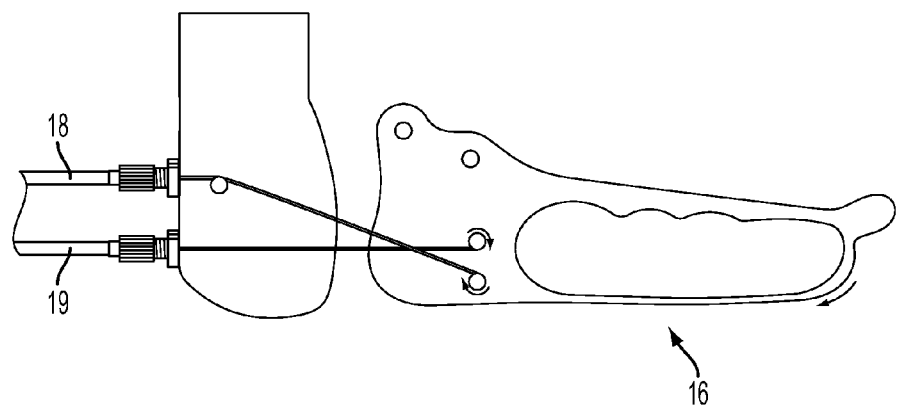
FIG. 7A is a side close-up view of the cables within the housing of the hand brakes.
Figure 7B:
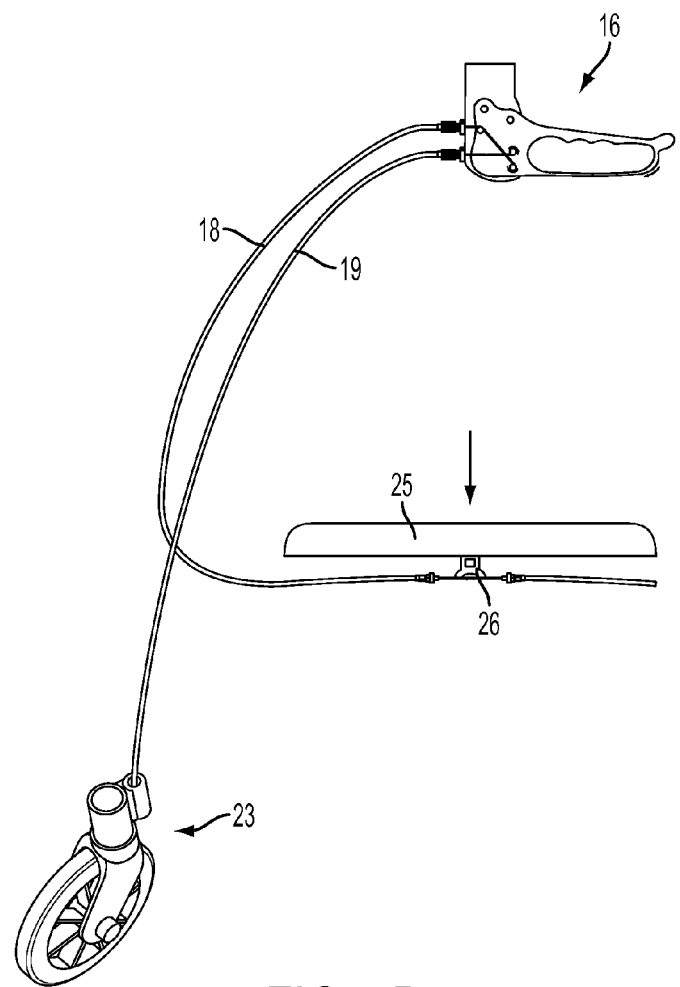
FIG. 7B is a side view showing the connection of the cables to the sit-to-lock mechanism and the wheel brake mechanism.

Referring to FIG. 7A, the single cable, 18, running between the hand brakes is shown attached inside the housing of the hand brake, 16, at a different pivot point to the other cable, 19, which runs to the wheel brake mechanism, 23. Referring to FIG. 7B, cable 18 is shown running from the hand brake down to the sit-to-lock seat, while the other cable, 19, is shown running to the wheel brake mechanism. Due to the differing points of attachment, when cable 18 is stretched by the weight of the rollator user sitting down, it will cause the hand brake to pivot downwards, which in turn stretches cable 19 causing the wheel brake mechanism to lock. As a result, the rollator may not be pushed or wheeled while the user remains seated. When the user rises from the seat, the hand brakes, 16, 17, will remain in the locked position. The user must disengage the hand brakes from the locked position before the rollator can be moved once more.

While preferred embodiments of the invention have been described herein, many variations are possible which remain within the concept and scope of the invention. Such variations would become clear to one of ordinary skill in the art after inspection of the specification and the drawings. Accordingly, the exemplary embodiments of the invention, as set forth above, are intended to be illustrative, not limiting.

What is claimed is:

1. A rollator comprising:
   a. a walking frame that includes at least one handle bar, a seat, and a plurality of wheels
   b. at least one brake mechanism associated with one of the plurality of wheels,
   c. at least one hand brake mounted with respect to the at least one handle bar, and
   d. at least one brake cable that extends from the at least one hand brake to the at least one brake mechanism;
   wherein the at least one brake cable is positioned at least in part under the seat,
   wherein the seat is adapted for movement between a raised position and a lowered position; and
   wherein movement of the seat from the raised position to the lowered position causes the at least one brake cable positioned at least in part thereunder to be stretched, thereby actuating the at least one brake mechanism to apply a braking force to the one of the plurality of wheels.

2. The rollator according to claim 1, wherein the walking frame includes a first handle bar and a second handle bar, and wherein a first hand brake is mounted with respect to the first handle bar and wherein a second hand brake is mounted with respect to the second handle bar.

3. The rollator according to claim 2, wherein a first brake cable extends from the first hand brake to a first brake mechanism associated with a first wheel, and wherein a second brake cable extends from the second hand brake to a second brake mechanism associated with a second wheel.

4. The rollator according to claim 3, wherein both the first brake cable and the second brake cable are positioned at least in part under the seat.

5. The rollator according to claim 4, wherein movement of the seat from the raised position to the lowered position causes (i) the first brake cable positioned at least in part thereunder to be stretched, thereby actuating the first brake mechanism to apply a braking force to a first wheel, and (ii) the second brake cable positioned at least in part thereunder to be stretched, thereby actuating the second brake mechanism to apply a braking force to a second wheel.

6. A rollator according to claim 1, wherein movement of the seat from the lowered position to the raised position automatically releases the braking force applied to the one of the plurality of wheels.

7. A rollator according to claim 1, wherein movement of the seat from the lowered position to the raised position does not automatically release the braking force applied to the one of the plurality of wheels.

8. A rollator according to claim 7, wherein release of the braking force applied to the one of the plurality of wheels is effectuated by release of the at least one hand brake.

9. A rollator according to claim 1, further comprising a push block mounted with respect to an underside of the seat.

10. A rollator according to claim 9, wherein movement of the seat from the raised position to the lowered position causes the push block to stretch the at least one brake cable positioned at least in part thereunder, thereby actuating the at least one brake mechanism to apply a braking force to the one of the plurality of wheels.

11. A rollator according to claim 9, wherein the push block rests upon, but does not apply a stretching force to, the at least one brake cable when the seat is in the raised position.

12. The rollator according to claim 1, wherein the walking frame further includes at least one cross bar that extends below the seat, and wherein the at least one brake cable runs parallel to and alongside the cross bar.

13. The rollator according to claim 1, wherein the seat is adapted to move from the raised position to the lowered position in response to seating of an individual on the seat.

14. A rollator comprising:
  a. a walking frame that includes at least one handle bar, a seat, and a plurality of wheels
  b. a brake mechanism associated with one of the plurality of wheels,
  c. a hand brake mounted with respect to the at least one handle bar,
  d. a first brake cable that extends from the hand brake to the brake mechanism; and
  e. a second brake cable that extends from the hand brake and is positioned at least in part under the seat;
  wherein the seat is adapted for movement between a raised position and a lowered position; and
  wherein movement of the seat from the raised position to the lowered position causes the second brake cable that is positioned at least in part thereunder to be stretched, thereby causing the hand brake to stretch the first brake cable, and thereby actuating the brake mechanism to apply a braking force to the one of the plurality of wheels.

15. A rollator according to claim 14, wherein mounting of the first brake cable relative to the hand brake defines a first pivot point, and wherein mounting of the second brake cable relative to the hand brake defines a second pivot point, and wherein the first pivot point is different than the second pivot point.

16. A rollator according to claim 15, wherein stretching of the second brake cable causes the hand brake to rotate relative to the second pivot point.

17. A rollator according to claim 14, wherein return movement of the seat from the lowered position to the raised position does not cause rotation of the hand brake relative to the second pivot point.

18. A rollator according to claim 14, further comprising a push block mounted with respect to an underside of the seat.

19. A rollator according to claim 18, wherein movement of the seat from the raised position to the lowered position causes the push block to stretch the second brake cable positioned at least in part thereunder, thereby causing the hand brake to stretch the first brake cable, and thereby actuating the brake mechanism to apply a braking force to the one of the plurality of wheels.

20. The rollator according to claim 14, wherein the seat is adapted to move from the raised position to the lowered position in response to seating of an individual on the seat.

* * * * *